April 21, 1964   H. O. MOORE   3,130,328
SAFETY DEVICE FOR DUAL VOLTAGE CIRCUITS
Filed May 24, 1961

# United States Patent Office 3,130,328
Patented Apr. 21, 1964

3,130,328
SAFETY DEVICE FOR DUAL VOLTAGE CIRCUITS
Harry O. Moore, 2321 Rozzells Ferry Road, Charlotte 8, N.C., assignor of fifty percent to Chris Combis, Charlotte, N.C.
Filed May 24, 1961, Ser. No. 112,459
2 Claims. (Cl. 307—130)

This invention relates to electric circuit controls and more especially, to an improved automatic voltage selecting device particularly adapted for use as a safety device to insure that multi-voltage apparatuses, such as dual voltage electric motors, are properly connected with respect to the supply voltage.

As is well known, the motors of many electrical appliances are adapted to run on low or high line voltages of alternating or direct current, such as 110 volts or 220 volts. Such motors are generally provided with two windings and a manually operated switch for connecting the windings in parallel for low voltage operation and in series for high voltage operation.

Now, assuming that the motor of an electrical appliance is adapted to run on either 110 volts or 220 volts, if the manual switch is so positioned that the windings are in parallel and the motor is connected to a 220 volt supply line, the motor will become damaged and may even burn out, due to the over-heating effected by the excessive voltage. Conversely, if the manual switch is so positioned that the windings are in series and the motor is connected to a 110 volt supply line, the relatively low voltage supply usually would be insufficient to start the motor if the motor was under a normal load at the time it was connected to the 110 volt supply line. Also, if the motor was not under a load at the time it was connected to the 110 volt supply line, the low voltage would be insufficient to cause the rotor of the motor to reach synchronous speed or to maintain its prescribed speed when subsequently subjected to the load for which the motor was designed.

Thus, in instances in which the motor was under a load when connected to the 110 volt supply line, with its windings connected in series, it would be subjected to excessive current and would burn out in a relatively short period of time. The motor would also burn out in instances in which it was not under a load at the time it was connected to the 110 volt supply line, if it was permitted to run for any considerable period of time while the windings thereof were connected in series.

Many attempts have been made heretofore to provide a voltage selecting device capable of automatically changing the connections of the windings of a dual voltage motor or other apparatus in accordance with the voltage of the power source to which the motor or other apparatus is to be connected. However, there have been many defects in such prior art voltage selecting devices.

One type of such prior art voltage selecting device has required the use of the manually operated switch heretofore described, which had to be properly positioned prior to the electric motor or other device being connected to a source of electrical energy and, thus, was not foolproof. Another type of prior art voltage selecting device which has been relatively inexpensive to manufacture has been entirely unsatisfactory and has never been placed in commercial use to my knowledge, because of the fact that mating electrical contacts therein would become fused or welded together by the sudden inrush of high current therethrough whenever the windings of the motor were in parallel; i.e., arranged for low voltage operation, and the motor or other electrical apparatus was connected to a high voltage power source. Thus, the contacts would not open and could not, therefore, switch the windings from parallel to series relationship.

It is, therefore, an object of this invention to provide means to automatically selectively effect connections between the windings of a multi-voltage electric motor or other apparatus in response to the voltage supply to which the apparatus is connected.

It is another object of this invention to provide a simple, fool-proof and efficient automatic voltage selecting device to connect the windings of a dual voltage motor or other dual voltage apparatus in accordance with and in response to the voltage of the power supply to which the dual voltage apparatus is connected.

It is a more specific object of this invention to provide a novel voltage selecting device comprising master relay means normally arranged to complete a low voltage parallel connection between the windings of a dual voltage motor or other dual voltage apparatus through a high-resistance wound solenoid operated delay relay, and wherein the master relay means is responsive to high voltage only to complete a high voltage series connection between such windings and through said delay relay, the delay relay particularly serving to delay completion of the high voltage series connection for a sufficient interval of time following initial response of the master relay means to said high voltage to insure that the contacts on the armature thereof move out of engagement with certain lower voltage contacts before high line voltage is permitted to pass between the said lower voltage contacts and said armature contacts, thus insuring that the armature contacts do not become fused to the lower voltage contacts. If the high voltage was permitted to pass between the low voltage contacts and the armature contacts, the parallel connection between the windings would cause an excessively high current to flow in the circuit even though the master relay means might then be subjected to the high voltage, with the result that the flux of the master relay means would be exerting a pull on the armature thereof and the high current would then arc between the low voltage contacts and the armature contacts and cause the same to become tightly fused or welded together, which condition is automatically obviated by the present novel voltage selecting device.

Some of the objects of the invention having been stated, other objects will appear as the description proceeds, when taken in connection with the accompanying drawing, in which—

Figure 1:
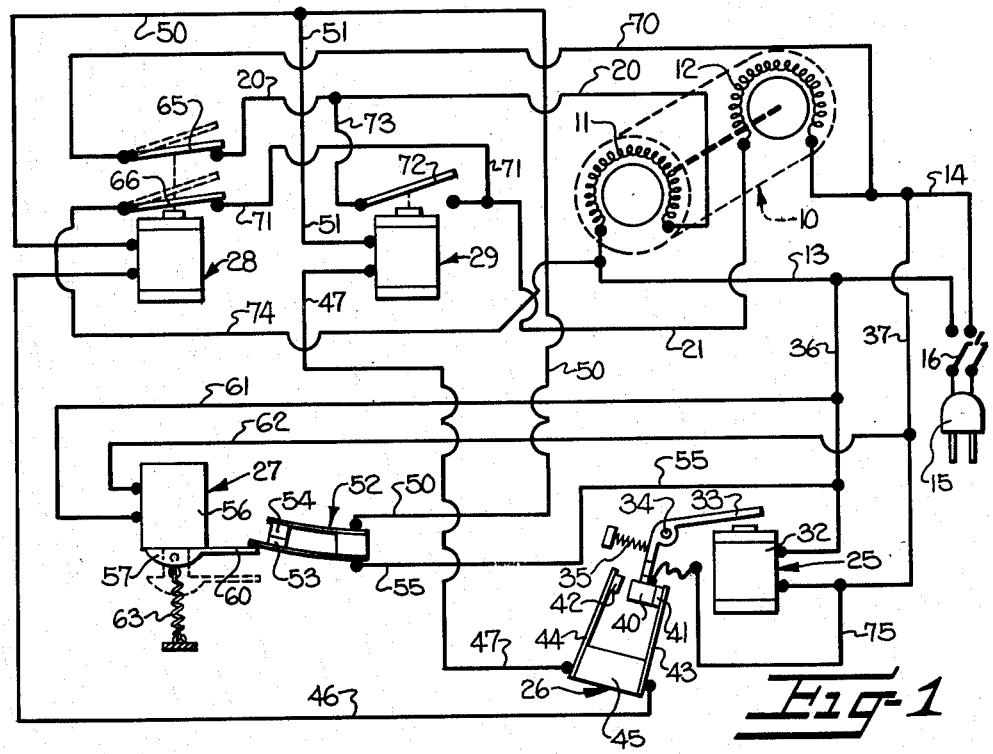
FIGURE 1 is a schematic diagram of the voltage selecting device of the present invention in association with the windings of a dual voltage motor with the various parts thereof occupying such positions that the motor windings are in parallel for low voltage operation.

Referring more specifically to the drawings, the dual voltage apparatus is broadly designated at 10 and will be termed hereinafter as an electric motor, although other dual voltage apparatuses may be controlled by the improved circuit selecting device of the present invention. The motor 10 is provided with two windings 11, 12 which are adapted, through the medium of the present invention, to be connected in parallel for relatively low voltage operation and which are adapted to be connected in series for relatively high voltage operation. For purposes of description, it shall be assumed that the two windings 11, 12 are to be in parallel when connected to a 110 volt power source when they are in parallel and they are to be connected to a 220 volt power source when they are in series.

The motor 10 has two lead conductors 13, 14 extending therefrom to an electrical connector 15 adapted to be connected to a source of electrical energy of either 110 or 220 volts, in this instance. A suitable manually operable master switch 16 may be interposed in the conductors 13, 14. The ends of the conductors 13, 14 opposite from connector 15 are connected to corresponding ends of the coils or windings 11, 12.

The other ends of windings 11, 12 have respective conductors 20, 21 connected thereto which have been manually interconnected heretofore for connecting the windings 11, 12 in series for high voltage operation, and which have been manually connected to the source of current heretofore for connecting the windings 11, 12 in parallel for low voltage operation. As heretofore stated, the present voltage selecting device automatically establishes series or parallel connections between the source of power and the windings 11, 12 in response to the particular output voltage at the source, as will now be described.

Figure 2:
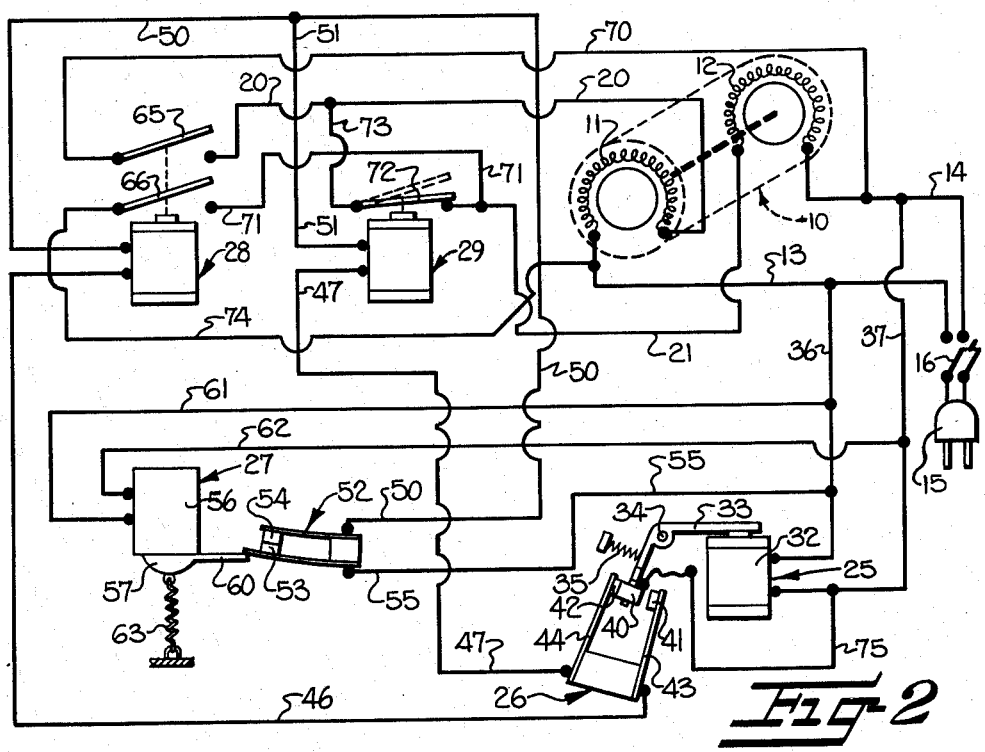
FIGURE 2 is a view similar to FIGURE 1 wherein the various operating parts of the device occupy positions such that the motor windings are in series for high voltage operation.

The main components of the novel voltage selector device of FIGURES 1 and 2 include a quick-acting master relay 25 equipped with a first, double-throw switch 26, a slow acting, solenoid operated, time relay relay 27, a quick acting, normally open, low voltage relay 28, and a quick acting, normally open, high voltage relay 29. Master relay 25 includes an electromagnet 32 and an armature 33. Armature 33 is pivoted, as at 34, and is normally biased away from the core of electromagnet 32 by a spring 35.

The coil of electromagnet 32 is so constructed that sufficient flux will be developed thereby to attract the armature 33 into engagement with the end of the core thereof only when the voltage applied to the coil of the electromagnet 32 is well above that of the low voltage supply to which motor 10 is to be connected; i.e., 110 volts. In other words, electromagnet 32 is operatively excitable at a minimum voltage substantially exceeding the lower voltage to which lead or input conductors 13, 14 may be connected. However, the electromagnet must be operatively excitable at a minimum voltage not exceeding the higher voltage to which input connectors 13, 14 may be connected.

Assuming that the motor 10 is constructed for 110 or 220 volt operation, the coil of electromagnet 32 is preferably so constructed that it will be operatively excited, and will create sufficient flux to attract the armature 33 to the core thereof, only when the voltage applied to the coil of electromagnet 32 is at a minimum of from 180 to 200 volts. It will be noted that the coil of electromagnet 32 is connected directly to the lead conductors 13, 14 by conductors 36, 37.

The end of the armature 33 opposite from electromagnet 32 has a movable metallic contact 40 thereon which is suitably insulated from armture 33 and which normally engages a mating low voltage contact 41. Movable contact 40 is adapted to move out of engagement with mating low voltage contact 41 and into engagement with a mating high voltage contact 42 when armature 33 is attracted to the core of electromagnet 32. Contacts 40, 41, 42 are parts of the double-throw switch 26. Contacts 41, 42 may be mounted adjacent the free ends of metallic leaf spring members 43, 44 suitably secured to opposed sides of a fixed insulation block 45.

Contacts 41, 42 are connected to corresponding ends of respective conductors 46, 47 through the medium of the leaf spring members 43, 44. The ends of conductors 46, 47 opposite from double-throw switch 26 are connected to corresponding ends of the coils of relays 28, 29, from the other ends of which extend respective conductors 50, 51.

Conductor 51 is also connected to a medial portion of conductor 50, and the end of conductor 50 opposite from relay 28 is connected to one side of a second, normally open, switch 52. Switch 52 comprises a pair of normally spaced yieldably mounted contacts 53, 54 to which corresponding ends of a conductor 55 and the conductor 50 are connected. The end of conductor 55 opposite from switch 52 is connected to conductor 36 and, thus, to lead conductor 15.

Switch 52 is a part of solenoid operated time delay relay 27, which relay 27 comprises a solenoid coil 56, and a solenoid plunger 57 having an extension 60 thereon which is adapted to move into engagement with and close contact 53 with respect to contact 54. The coil 56 of solenoid relay 27 is of a high resistance type which is operatively excitable when connected to either 110 or 220 volts. Thus, opposed ends of coil 56 are connected to conductors 36, 37 by means of respective conductors 61, 62, so that current flows through coil 56 of solenoid relay 27 whenever switch 16 is closed and connector 15 is connected to a source of electrical energy of either 110 or 220 volts.

Although the solenoid plunger 57 may occupy the extended broken line position in FIGURE 1 solely by the weight thereof when coil 56 is deenergized, plunger 57 may normally be urged to extended position by any suitable means such as a relatively light tension spring 63.

The solenoid coil 56 should be so constructed that when excited by a 110 volt power source, the flux developed thereby exerts a retracting or pulling force on the solenoid plunger 57 which is only very slightly greater than the opposing force produced by the weight of plunger 57 or the spring 63, as the case may be, thus insuring that movable contact 40 of switch 26 will move out of engagement with contact 41 and into engagement with contact 42 before plunger 57 has moved sufficiently to close switch 52 when the switch 16 is initially closed following the connecting of connector 15 to a 220 volt power supply. This delayed closing of switch 52 following the introduction of high voltage current to lead conductors 13, 14 is extremely important in order to prevent the contacts 40, 41 from becoming fused or welded together before the contact 40 has moved a safe distance away from contact 41 under the influence of electromagnet 32, as will be later described.

In order to effect the desired slow movement to plunger 57 when the solenoid coil 56 is connected across a source of either high or low voltage, such as 220 or 110 volts, it has been found desirable to construct the coil so that peak efficiency thereof may be obtained when coil 56 is connected across a source of voltage having an output voltage for exceeding that of the high voltage source to which the motor may be connected. For example, the coil 56 may be constructed for peak efficiency at 450 volts when the circuit is used with electrical apparatus which will run on 110 or 220 volts. By peak efficiency, I mean that the flux developed by excitation of coil 56 at a certain high voltage is such as to cause the plunger 57 to snap into coil 56 very quickly, which peak efficiency must not be attained at any time in the present voltage selecting device.

The low voltage relay 28 includes a pair of parallel, normally open switch bars 65, 66 which are moved to closed position when the coil of low voltage relay 28 is energized so as to establish contact between respective conductors 20, 74 and respective conductors 70, 71.

The end of conductor 70 opposite from relay switch bar 65 is connected to a medial portion of lead conductor 14, the end of conductor 71 opposite from relay switch bar 66 is connected to a medial portion of conductor 21, and the end of conductor 74 opposite from switch bar 66 is connected to lead conductor 13.

High voltage relay 29 includes a normally open switch bar 72 which is closed upon energization of the coil of relay 29 to establish contact between conductor 21 and a conductor 73. The latter conductor 73 extends to a medial portion of conductor 20. The armature contact 40 has a conductor 75 leading therefrom to a medial portion of conductor 37, thus completing the description of the circuit of the improved voltage selector device. It should be noted that switches 26, 52 are in series between input conductors 13, 14 and the windings 11, 12 of motor 10 regardless of whether switch bars 65, 66 or switch bar 72 are closed.

Method of Operation

As heretofore stated, the windings 11, 12 must be connected in parallel for 110 volt or low voltage operation. Thus, it might be said that the circuit of the improved voltage selector device is normally arranged for 110 volt operation, in that the movable armature contact 40 normally bears against the low voltage contact 41 and remains in this position when the lead conductors 13, 14 are connected to a 110 volt power supply. When connector 15 is connected to a 110 volt power supply and switch 16 is closed, current immediately flows to the coils of electromagnet 32 and solenoid relay 27, because both of the latter coils are directly connected to the lead conductors 13, 14. Since the coil of electromagnet 32 is so wound that the flux developed thereby is insufficient to pull the armature 33 down against the pressure of spring 35, movable armature contact 40 remains in engagement with contact 41 of switch 26 while a current of 110 volts is flowing through lead conductors 13, 14.

Now, since the coil 56 of solenoid relay 27 is so wound that the flux developed thereby is barely sufficient to retract the plunger 57 of solenoid relay 27 when the coil 56 is subjected to 110 volts, it is apparent that the plunger 57 is retracted relatively slowly as compared to the speed at which the contact 40 would move from contact 41 to contact 42 if electromagnet 32 was excited. However, since electromagnet 32 is not effective to move armature downwardly when subjected to 110 volts, the movable armature contact 40 remains in its normal position in engagement with contact 41, and therefore, there is no necessity in there being a delay in the operation of solenoid relay 27 and such delay is merely incidental.

From the foregoing, it is apparent that, shortly after the lead conductors 13, 14 have been connected to a 110 volt power supply, a plunger 57 is retracted by the coil 56 of solenoid relay 27 and closes the switch 52. In so doing, current flows from lead conductor 13, through conductors 36, 55, switch 52, and conductor 50 to one side of the coil of the 110 volt or low voltage relay 28.

Current then flows through the latter coil, through conductor 46, leaf spring member 43, contacts 41, 40 and conductors 75, 37 to the other lead conductor 14. It is thus seen that, with the armature contact 40 in engagement with contact 41, current flows through the coil of low voltage relay 28 when switch 52 is closed by the plunger of solenoid relay 27.

When the coil of relay 28 is energized, switch bars 65, 66 move from the broken line open position to the solid line closed position in FIGURE 1, thus connecting the windings 11, 12 of motor 10 in parallel with respect to lead conductors 13, 14. When the windings 11, 12 are connected in parallel for 110 volt operation, current flows from lead conductor 13, through winding 11, conductor 20, switch bar 65 of low voltage relay 28 and through conductor 70 to lead conductor 14. At the same time, current flows from lead conductor 13, through conductor 74, switch bar 66 of low voltage relay 28, conductors 71, 21 and winding 12 of motor 10 to conductor 14.

The operation of the voltage selector device will now be given for 220 volt or high voltage operation, in which the windings 11, 12 are connected in series.

Referring to FIGURE 2, and assuming that connector 15 is connected to a 220 volt power supply, immediately upon closing master switch 16, current immediately flows at 220 volts through the coils of electromagnet 32 and solenoid relay 27. Since the 220 volts applied to the coil of electromagnet 32 develops sufficient flux to pull the armature 33 downwardly as shown in FIGURE 2, the movable contact 40 is moved out of engagement with contact 41 and into engagement with contact 42 of switch 26.

Also, since the coil 56 of solenoid relay 27 is so wound that it will retract the solenoid plunger 57 at a relatively slow rate as compared to the speed at which the armature 33 is pulled against the core of electromagnet 32, armature contact 40 will have moved into engagement with contact 42 of switch 26 before the extension 60 on plunger 57 engages and closes switch 52. It might be stated here that, even though the movement of plunger 57 is somewhat faster when the coil 56 of solenoid relay is subjected to 220 volts than it is when the coil 56 is subjected to 110 volts, the coil 56 could be so wound that the plunger 57 would not snap into retracted position unless 450 volts, for example, was applied to the coil 56 of solenoid relay 27, thus insuring that contact 42 moves out of engagement with contact 41 and into engagement with contact 42 before switch 52 is closed.

Since armature contact 40 is in engagement with contact 42 when switch 52 of solenoid relay 27 is closed, current then flows from lead conductor 13, through conductor 55, switch 52, conductors 50, 51, and through the coil of high voltage relay 29. Current then flows through conductor 47, leaf spring member 44, contacts 42, 40, and conductors 75, 37 to lead conductor 14. Thus, the coil of high voltage relay 29 is energized while the coil of low voltage relay 28 remains deenergized, and switch arm 72 is thus moved from the broken line to the solid line position in FIGURE 2.

In so doing, the windings 11, 12 are placed in series, since current then flows from lead conductor 13, through winding 11 of motor 10, through conductors 20, 73, through the switch arm 72 of high voltage relay 29, through conductor 21 and winding 12 to lead conductor 14.

It is thus seen that the present invention provides a simple and efficient means to automatically control the winding connections of a dual voltage motor or other electrical apparatus immediately upon the motor switch being closed so that, regardless of whether the lead conductors 13, 14 are connected to a low supply voltage or a high supply voltage, the winding connections will always be in proper relationship for the supply voltage.

It is apparent that other types of delay relays may be substituted for the solenoid relay 27, such as the well known dash-pot type of delay relay or a resistance-wound bimetallic relay, without departing from the spirit of the invention. However, the solenoid type of delay relay described herein is much preferred, since the dash-pot type of relay is relatively large and space consuming and also substantially more expensive to manufacture than the solenoid type of relay disclosed herein. Further, the solenoid type of relay is preferred over the resistance-wound bimetallic type of relay because very little heat is created by the solenoid type of relay while, on the other hand, a resistance wound bimetallic type of relay would create considerable heat which would be objectionable, particularly if the relay is placed close to the motor, as would usually be desired. Although the coil 56 of solenoid relay 27 must operate on both 110 and 220 volts, there is a decrease in the amperes of current in the coil 56 of solenoid 27 as the plunger 57 is drawn into the same and this, coupled with the fact that the plunger 57 remains in a fixed position throughout the operation of the motor 10, insures that the coil 56 of solenoid relay 27 remains relatively cool throughout the operation of motor 10.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a safety device for use with an electrical apparatus having input conductors for selectively connecting the apparatus to either of two sources of electrical energy of different output voltages, an electromagnet and a solenoid coil connected in parallel across said input conductors, a retractable normally yieldably extended plunger in said solenoid coil, said electromagnet and said coil being operatively excitable by different minimum voltages, said electromagnet requiring a higher minimum excitation voltage than said solenoid coil, an armature adjacent to and normally biased away from said electromagnet to one position and being movable from said one position to another position when said electromagnet is subjected to said higher minimum excitation voltage, said coil being so constructed that the flux developed thereby at said minimum voltages produces a magnetic pulling force on the yieldably extended plunger which is only silghtly greater than the opposing pull of the plunger whereby said plunger is still being retracted after the armature is moved to said other position by excitation of said electromagnet at said higher minimum voltage, conductor means for connecting said apparatus to said input conductors, a first switch having at least two contacts interposed in said conductor means, one of said contacts being movable with said armature and engaging the other of said contacts when said armature occupies said one position whereby said one of the contacts moves away from said other of the contacts when said electromagnet is subjected to said higher minimum excitation voltage, a second normally open switch interposed in said conductor means, and means responsive to retraction of said plunger by said coil for closing said second switch.

2. In a safety device for use with an electrical apparatus having two coils adapted to be connected selectively in parallel and in series and having input conductors for selectively connecting the apparatus to two sources of electrical energy of different output voltages, an electromagnet and a solenoid coil connected in parallel across said input conductors, a retractable normally yieldably extended plunger in said solenoid coil, said electromagnet and said coil being operatively excitable by different minimum voltages, said electromagnet requiring a higher minimum excitation voltage than said solenoid coil, an armature adjacent to and normally biased away from said electromagnet to one position and being movable from said one position to another position when said electromagnet is subjected to said higher minimum excitation voltage, said coil being so constructed that the flux developed thereby at said minimum voltages produces a magnetic pulling force on the yieldably extended plunger which is only slightly greater than the opposing pull of the plunger whereby said plunger is still being retracted after the armature is moved to said other position by excitation of said electromagnet at said higher minimum voltage, conductor means for connecting said device to said input conductors, a first switch having at least two contacts interposed in said conductor means, one of said contacts being movable with said armature and engaging the other of said contacts when said armature occupies said one position whereby said one of the contacts moves away from said other of the contacts when said electromagnet is subjected to said higher minimum excitation voltage, an additional contact engageable by said one of the contacts when it moves away from said other of the contacts, a second normally open switch interposed in said conductor means, means responsive to retraction of said plunger by said coil for closing said second switch, means automatically operable to connect said first-named two coils in parallel through said second switch and said two contacts of said first switch when the input conductors are connected to an output voltage less than said higher minimum voltage, and means automatically operable to connect said first-named two coils in series through said second switch and said one of the contacts of said first switch and said additional contact when the input conductors are connected to an output voltage at least as great as said higher minimum voltage.

References Cited in the file of this patent
UNITED STATES PATENTS

| | | |
|---|---|---|
| 2,157,417 | Kneisley | May 9, 1939 |
| 2,229,955 | Bostroem | Jan. 28, 1941 |
| 2,613,343 | Ober | Oct. 7, 1952 |